US 11,522,956 B2

(12) United States Patent
Frank et al.

(10) Patent No.: US 11,522,956 B2
(45) Date of Patent: Dec. 6, 2022

(54) OBJECT STORAGE IN CLOUD WITH REFERENCE COUNTING USING VERSIONS

(71) Applicant: Google LLC, Mountain View, CA (US)

(72) Inventors: Shahar Frank, Ramat Hasharon (IL); Amir Mosek, Mountain View, CA (US)

(73) Assignee: Google LLC, Mountain View, CA (US)

(*) Notice: Subject to any disclaimer, the term of this patent is extended or adjusted under 35 U.S.C. 154(b) by 47 days.

(21) Appl. No.: 16/844,933

(22) Filed: Apr. 9, 2020

(65) Prior Publication Data

US 2020/0236172 A1   Jul. 23, 2020

Related U.S. Application Data

(63) Continuation of application No. 15/406,724, filed on Jan. 15, 2017, now Pat. No. 10,652,330.

(51) Int. Cl.
*H04L 67/1097* (2022.01)
*G06F 16/21* (2019.01)

(52) U.S. Cl.
CPC ........ *H04L 67/1097* (2013.01); *G06F 16/219* (2019.01)

(58) Field of Classification Search
CPC ............................ H04L 67/1097; G06F 16/219
See application file for complete search history.

(56) References Cited

U.S. PATENT DOCUMENTS

| 8,375,011 B2* | 2/2013 | Fox ....................... G06F 16/951 |
| | | 707/695 |
| 8,457,018 B1 | 6/2013 | Ruef et al. | |
| 8,832,466 B1 | 9/2014 | McGregor, Jr. et al. | |
| 9,705,730 B1 | 7/2017 | Petri et al. | |
| 9,886,443 B1 | 2/2018 | Gupta et al. | |
| 10,019,459 B1* | 7/2018 | Agarwala ............ G11C 7/1072 |
| 10,242,065 B1 | 3/2019 | Starling et al. | |
| 2005/0257074 A1 | 11/2005 | Alkove et al. | |
| 2010/0274772 A1 | 10/2010 | Samuels | |
| 2010/0332401 A1 | 12/2010 | Prahlad et al. | |
| 2010/0333116 A1* | 12/2010 | Prahlad .................. G06F 16/41 |
| | | 719/328 |
| 2011/0307451 A1* | 12/2011 | El Haddi .............. G06F 16/164 |
| | | 707/673 |
| 2013/0041872 A1* | 2/2013 | Aizman ................ G06F 16/182 |
| | | 707/690 |
| 2013/0104251 A1 | 4/2013 | Moore et al. | |
| 2014/0006465 A1 | 1/2014 | Davis et al. | |
| 2014/0222758 A1 | 8/2014 | March et al. | |
| 2015/0052144 A1 | 2/2015 | Mari et al. | |

(Continued)

*Primary Examiner* — Jason D Recek

(74) *Attorney, Agent, or Firm* — Honigman LLP; Brett A. Krueger

(57) ABSTRACT

A data storage apparatus includes an interface and one or more processors. The interface is configured for communicating with a cloud-based object storage system 5 having a built-in versioning mechanism that assigns version numbers to objects stored therein. The one or more processors are configured to receive data for storage from one or more workloads, to store the data as objects in the cloud-based object storage system, and to 10 update and record reference counts for at least some of the objects, by forcing the built-in versioning mechanism of the cloud-based object storage system to update the version numbers so as to match the reference counts.

20 Claims, 2 Drawing Sheets

(56) References Cited

U.S. PATENT DOCUMENTS

| | | |
|---|---|---|
| 2015/0261776 A1 | 9/2015 | Attarde et al. |
| 2016/0057226 A1* | 2/2016 | Bestler ................ H04L 67/1095 709/217 |
| 2017/0075938 A1 | 3/2017 | Black et al. |
| 2017/0249246 A1 | 8/2017 | Bryant et al. |
| 2017/0277452 A1 | 9/2017 | Joshi |
| 2018/0183592 A1 | 6/2018 | Campagna et al. |
| 2018/0196842 A1* | 7/2018 | Maybee ............. G06F 11/3006 |
| 2018/0198765 A1 | 7/2018 | Maybee et al. |
| 2018/0275902 A1 | 9/2018 | Monday et al. |

\* cited by examiner

OBJECT STORAGE IN CLOUD WITH REFERENCE COUNTING USING VERSIONS

CROSS REFERENCE TO RELATED APPLICATIONS

This U.S. patent application is a continuation of, and claims priority under 35 U.S.C. § 120 from, U.S. patent application Ser. No. 15/406,724, filed on Jan. 15, 2017. The disclosure of this prior application is considered part of the disclosure of this application and is hereby incorporated by reference in its entirety.

TECHNICAL FIELD

The present invention relates generally to data storage, and particularly to methods and systems for cloud-based object storage.

BACKGROUND

Various computing systems and applications use cloud services for data storage. Cloud services may provide block storage, file storage and/or object storage. One example of a cloud-based object storage service is the Amazon Simple Storage Service (S3). S3 is described, for example, in "Amazon Simple Storage Service-Developer Guide-API Version 2006-03-01," Dec. 13, 2016, which is incorporated herein by reference.

SUMMARY

An embodiment of the present invention that is described herein provides a data storage apparatus including an interface and one or more processors. The interface is configured for communicating with a cloud-based object storage system having a built-in versioning mechanism that assigns version numbers to objects stored therein. The one or more processors are configured to receive data for storage from one or more workloads, to store the data as objects in the cloud-based object storage system, and to update and record reference counts for at least some of the objects, by forcing the built-in versioning mechanism of the cloud-based object storage system to update the version numbers so as to match the reference counts.

In some embodiments, the one or more processors are configured to calculate hash values over the data in the objects, and to store the objects in the cloud-based object storage system with the hash values serving as keys. In an example embodiment, the one or more processors are configured to update and record a reference count of a given object by detecting that an existing object was previously stored using a same hash value as the given object, and in response forcing the built-in versioning mechanism to increment a version number of the existing object.

In another embodiment, the one or more processors are configured to force the built-in versioning mechanism to update a version number of an object by sending to the cloud-based object storage system an instruction to update a metadata of the object but not a value of the object. In yet another embodiment, the one or more processors are configured to force the built-in versioning mechanism to update a version number of an object by sending to the cloud-based object storage system an instruction to update both a metadata of the object but and a value of the object. In still another embodiment, for a given object, the one or more processors are configured to (i) define a dummy object associated with the given object, and (ii) update a reference count for the given object by forcing the built-in versioning mechanism of the cloud-based object storage system to update a version number of the dummy object.

There is additionally provided, in accordance with an embodiment of the present invention, a method for data storage, including receiving data for storage from one or more workloads. The data is stored as objects in a cloud-based object storage system having a built-in versioning mechanism that assigns version numbers to the objects stored therein. Reference counts are updated and recorded for at least some of the objects, by forcing the built-in versioning mechanism of the cloud-based object storage system to update the version numbers so as to match the reference counts.

There is also provided, in accordance with an embodiment of the present invention, a computer software product, the product including a tangible non-transitory computer-readable medium in which program instructions are stored, which instructions, when read by one or more processors, cause the processors to receive data for storage from one or more workloads, to store the data as objects in a cloud-based object storage system having a built-in versioning mechanism that assigns version numbers to the objects stored therein, and to update and record reference counts for at least some of the objects, by forcing the built-in versioning mechanism of the cloud-based object storage system to update the version numbers so as to match the reference counts.

The present invention will be more fully understood from the following detailed description of the embodiments thereof, taken together with the drawings in which:

DETAILED DESCRIPTION

Overview

Figure 1:
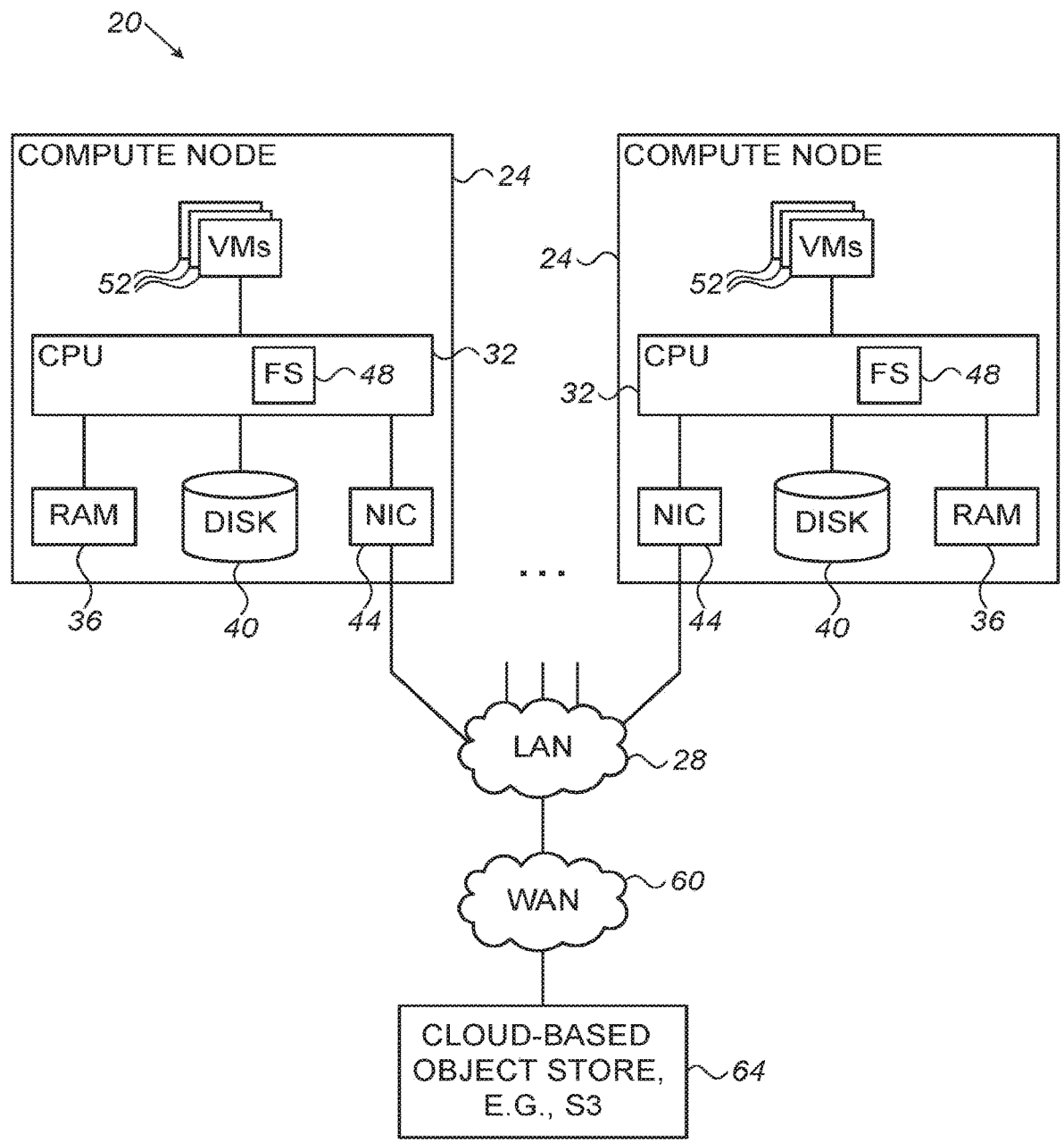
FIG. 1 is a block diagram that schematically illustrates a computing system, in accordance with an embodiment of the present invention.

Embodiments of the present invention that are described herein provide improved methods and systems for data storage. In some disclosed embodiments, a computing system runs workloads, e.g., Virtual Machines (VMs). A File System (FS) is used for storing directories and files for the workloads in persistent storage. The FS represents the files as objects, and stores the objects in a cloud-based object storage system such as the Amazon Simple Storage Service (S3).

Typically, when multiple objects originating from multiple files have the same content, the FS shares a single object among the files, rather than duplicating the object per file in the persistent storage. In order to carry out processes such as deduplication and garbage collection, the FS maintains a reference count that indicates the number of files that share the object. In the embodiments described herein, the cloud-based object storage system has a built-in versioning mechanism that assigns version numbers to objects stored therein. In S3, for example, objects are stored in a container referred to as a bucket, and versioning can be enabled or disabled en-bloc for the entire bucket. When enabled, each time an object is rewritten, S3 automatically assigns the rewritten object a new version number (VER ID), and retains the previous version of the object together with the previous version number.

In the embodiments described herein, the FS uses the built-in versioning mechanism of S3 for recording the reference counts of the various objects. In a typical flow, when preparing to store an object belonging to a certain file, the FS checks whether an object having the same data content already exists. For example, the FS may use hash values, calculated over the data of the various objects, as keys for accessing the objects in S3.

If an object having the same data content already exists in the S3 bucket, the FS only updates the metadata associated with the object, without storing the data again. The "update metadata" operation forces the versioning mechanism to increment the version number. As a result, the data of the shared object is not duplicated unnecessarily, and the current version number in S3 is indicative of the current reference count of the object in the FS. In an alternative embodiment, the FS rewrites the entire shared object, instead of only updating its metadata. In this embodiment, too, S3 increments the version number. This implementation causes some non-optimal duplication in data storage, but the reference counting remains correct.

In summary, the disclosed techniques record and track reference counts for objects shared among FS files, by exploiting the built-in versioning mechanism of S3, including built-in data structures and commands relating to handling version numbers. As a result, the FS data structures can be simplified, and memory space needed for metadata can be reduced. Moreover, the disclosed techniques reduce the number of storage operations applied to the cloud-based storage system, and therefore reduce operational costs. Additionally, the disclosed technique enables multiple writers to write the same object simultaneously, or to write and delete simultaneously, while still retaining the correct reference count. As such, the disclosed technique is highly scalable and lends itself to distributed implementations.

Perhaps most importantly, the disclosed techniques reduce the costs associated with cloud storage considerably. In a typical use-case, a cloud storage provider charges clients for storage as a function of (i) the total volume of content stored in the cloud, per unit time, (ii) the number of cloud access operations and (iii) the traffic volume transferred to and from with the cloud. Typically, the charge for the total volume of content dominates the overall cost of using the cloud storage service, as it is a recurring monthly cost that is charged as long as the content resides in the cloud. As can be appreciated, the disclosed techniques reduce the above costs considerably.

In another use-case, the cloud storage provider charges clients for different versions of content, even if the content is not actually duplicated multiple times. In this cost model, for example, updating the metadata of an object incurs substantially the same cost as duplicating the entire content. A variation of the disclosed techniques that avoids these duplicate costs by defining separate "reference-count objects" is also described.

System Description

FIG. 1 is a block diagram that schematically illustrates a computing system 20, in accordance with an embodiment of the present invention. System 20 may comprise, for example, a data center, a High-Performance Computing (HPC) system, or a computing system that performs any other suitable function.

System 20 comprises multiple compute nodes 24 that communicate with one another over a network 28, in the present example a Local Area Network (LAN). Compute nodes 24 are referred to herein as nodes, for brevity, and may comprise, for example, servers, workstations or any other suitable type of compute node. Nodes 24 may communicate over network 28 in accordance with any suitable network communication protocol, such as Ethernet or Infiniband.

System 20 may comprise any suitable number of compute nodes of any type. Nodes 24 may be collocated or located in multiple geographical locations. The collection of nodes 24 is also sometimes referred to as a cluster.

In the present example, each node 24 comprises a Central Processing Unit (CPU) 32, also referred to as a processor. Each node also comprises a volatile memory 36 such as Random Access Memory (RAM), and non-volatile storage 40, also referred to simply as disk, such as one or more Solid State Drives (SSDs) or Hard Disk Drives (HDDs). Each node 24 further comprises a network interface 44 such as a Network Interface Controller (NIC) for communicating over network 28.

CPU 32 of each node 24 runs one or more workloads, in the present example Virtual Machines (VMs) 52. Although the embodiments described herein refer mainly to VMs, the disclosed techniques can be used with any other suitable type of workloads, e.g., user applications, operating system processes or containers, and/or any other suitable software.

In some embodiments, each CPU 32 runs a respective File System (FS) module 48 that carries out various file management functions. The plurality of modules 48, running on CPUs 32 of nodes 24, implement a distributed FS that manages the storage of files. This distributed FS typically serves the various VMs 52 using a suitable storage protocol such as Network File System (NFS) or Server Message Block (SMB). In alternative embodiments, system 20 may run a centralized FS, e.g., on a dedicated server, instead of a distributed FS.

In the embodiment of FIG. 1, computing system 20 is connected via a Wide Area Network (WAN) 60, e.g., the Internet, to a cloud-based object storage system 64. Storage system 64 serves as the persistent storage media in which the distributed FS stores its data and metadata, e.g., files and directories. In the embodiments described herein, object storage system 64 comprises the Amazon Simple Storage Service (S3). The description that follows refers simply to "S3" for brevity. Alternatively, any other suitable cloud-based object storage system, e.g., Google Cloud Storage or Microsoft Azure, can be used.

The configurations of system 20 and nodes 24 shown in FIG. 1 are example configurations that are purely for the sake of conceptual clarity. In alternative embodiments, any other suitable system and/or node configuration can be used. For example, some or even all of the functionality of modules 48 may be implemented on one or more processors that are separate from nodes 24.

The different elements of system 20 and nodes 24 may be implemented using suitable hardware, using software, or using a combination of hardware and software elements. In some embodiments, CPUs 32 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

For the sake of clarity, the description that follows refers to "the FS" as carrying out the various storage tasks. In various embodiments, the functionality of the FS may be carried out by any one or more processors in system 20, e.g., collectively by FS modules 48 running on CPUs 32 of nodes 24, and/or by a processor of a dedicated centralized server.

In some embodiments, the FS uses the versioning mechanism of S3 to maintain reference counts for objects that are shared among multiple files. The description below briefly describes the way files and directories are represented in the FS, and then proceeds to explain how reference counts are implemented using S3 versioning.

File and Directory Representation Using Objects

Figure 2:
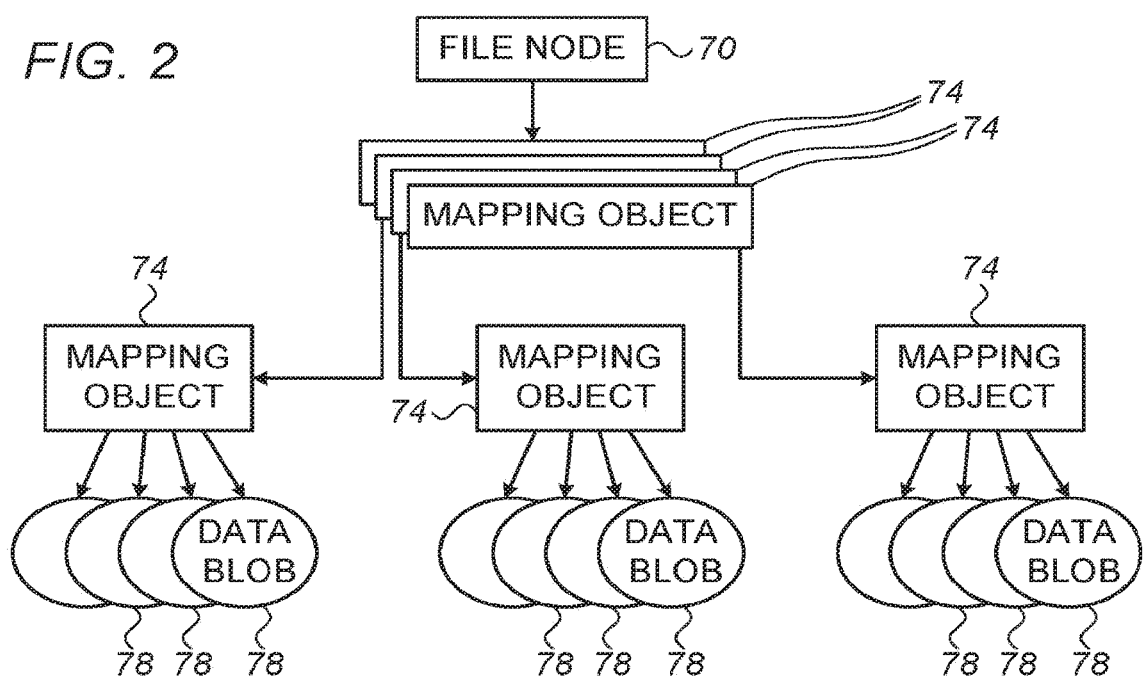
FIG. 2 is a diagram that schematically illustrates a representation of a file in file system, in accordance with an embodiment of the present invention.

FIG. 2 is a diagram that schematically illustrates a representation of a file in the FS of system 20, in accordance with an embodiment of the present invention. This structure shown in the figure is typically used for large files. Smaller files may be represented using simpler structures, as explained further below.

In the present example, the file is represented using a file node 70. Node 70 points to multiple mapping objects 74. In the present example, mapping objects 74 are arranged in a hierarchy of two layers. The mapping objects at the bottom layer point to "data blobs" 78 that hold the actual data of the file.

Each data blob 78 holds up to 512 KB of user data, plus 36 bytes of metadata. Each mapping object 74 in the next-higher layer can support multiple data blobs, together holding up to approximately 7 GB of user data. Such a mapping object typically holds an array of pointers that point to the data blobs. Each pointer comprises a 32-byte hash value calculated over the data of the corresponding data blob, plus 4 bytes of metadata such as attributes and/or flags. Node 70 holds metadata relating to the file as a whole.

FS using a smaller and simpler structure. For example, when the entire user data of a file fits in a single data blob 78, the file may be represented using a file node 70 that points to a single data blob 78, without intermediate mapping objects 74. In such a structure the file node 70 would hold, in addition to the file metadata, the hash value calculated over the data of the data blob. For larger files, an intermediate layer of (one or more) mapping objects 74, or multiple layers of mapping objects 74, may be created between the file node and the data blobs.

In an embodiment, the FS represents a directory in a similar manner. In such a representation, the directory as a whole is represented by a "directory node" at the top layer of the structure. The bottom layer comprises one or more "node buckets" that hold pointers to file nodes 70 of the files in the directory, and/or pointers to directory nodes of subdirectories. Each node bucket can hold up to 1024 such pointers. For large directories, one or more intermediate layers of "directory mapping objects" may be created between the directory node and the node buckets. As with the file structure shown in FIG. 2, in the directory representation too, each node holds hash values calculated over the nodes below it.

The representations of files and directories described above is an example representation, which is depicted purely for the sake of conceptual clarity. In alternative embodiments, the FS can represent files and/or directories in any other suitable manner and using any other suitable data structures.

Implementing Reference Counting Using S3 Versioning Mechanism

In S3, data is stored as objects, each having a value and a key. In some embodiments the FS represents each file or directory as one or more objects, and stores the objects in S3. For each object, the hash value calculated over the data (value) of the object serves as the key. The description that follows refers mainly to files, for clarity, but the disclosed techniques are applicable in a similar manner to directories, or to any other type of data that can be represented in terms of objects having values and keys.

In practice, it is quite possible that multiple objects originating from multiple files will have the same data. In such a case, the FS may share a single S3 object among the multiple files, rather than store multiple identical S3 objects.

When sharing an S3 object among multiple files, however, it is important to track the reference count of this object, i.e., the number of files that share the object. For example, when a file is deleted from the FS, the shared S3 object cannot be deleted if its reference count is larger than one, i.e., if it is shared by one or more other files.

In some embodiments, the FS uses the built-in versioning mechanism of S3 for tracking reference counts of S3 objects that are shared among multiple FS files. In these embodiments, the version numbers maintained by S3 (referred to as VER-IDs) are indicative of the reference counts. The FS typically does not store any additional reference counts, neither internal nor external to S3.

In S3, each object comprises a value (the data of the object) and metadata. When versioning is enabled, each time an object is rewritten S3 automatically assigns the rewritten object a new version number (VER ID). S3 retains the previous version of the object together with the previous version number. In addition, S3 supports an "update metadata" command that updates only the metadata, and not the value, of an object. Following this command, the updated metadata is assigned a new version number, and both the updated metadata (having the new version number) and the previous metadata (having the previous version number) point to the same value.

Figure 3:
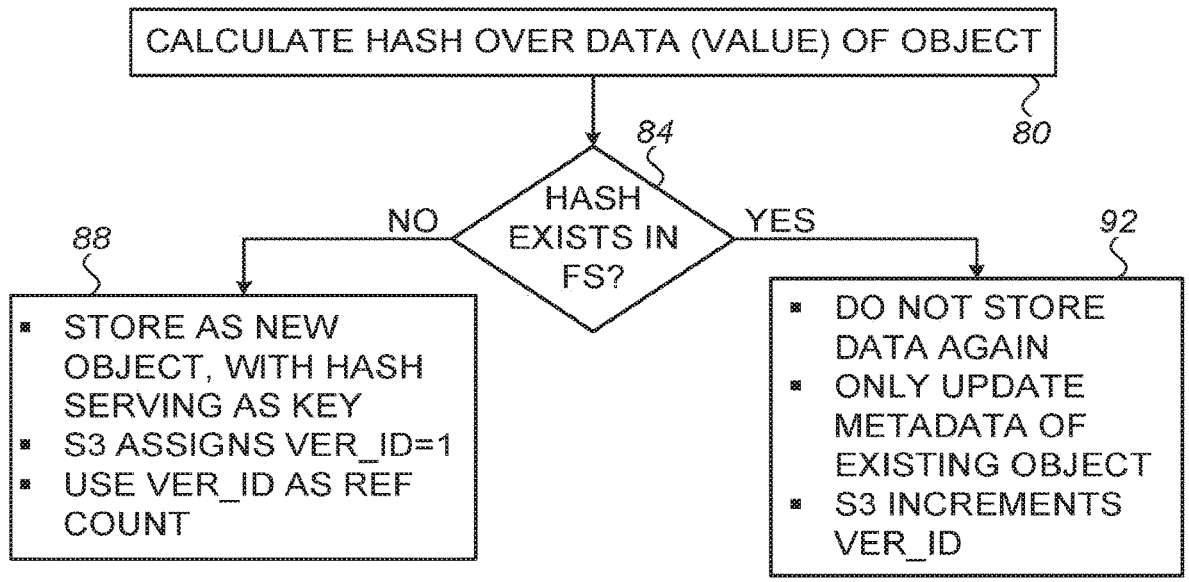
FIG. 3 is a flow chart that schematically illustrates a method for storing an object, including reference counting using S3 versioning, in accordance with an embodiment of the present invention.

FIG. 3 is a flow chart that schematically illustrates a method for storing an object, including reference counting using S3 versioning, in accordance with an embodiment of the present invention. The method of FIG. 3 may be invoked, for example, when a file is created or updated, in which case the FS creates a new object that needs to be stored in S3.

The method begins with the FS calculating a hash value over the data of the object, at a hash calculation step 80. At a checking step 84, the FS checks whether this hash value already exists, i.e., whether an object having the same data (value) was already stored in S3.

If no existing object having the same hash value is found, the FS stores the new object, at a new object storage step 88. The new object is stored with the hash value serving as the key. Since the key is new in the bucket, S3 automatically assigns the object a version number VER ID=1. From this point, the FS uses the version number (VER ID) assigned by S3 as the reference count of this object.

Back at checking step 84, if the FS finds that the hash value of the object to be stored already exists, the FS increments the reference count of this object without storing its data again, at an existing object storage step 92. In an embodiment, the FS issues a "metadata update" command for the object (without necessarily updating any of the metadata parameters). The metadata update command causes S3 to store an updated copy of the object metadata, and to issue a new version number (VER ID) for the updated metadata. Both the updated metadata and the previous metadata point to the same value (data) of the object.

As can be seen from the description above, at any given time the most-recent S3 version number (VER ID) of the object is indicative of the FS reference count.

The flow of FIG. 3 is depicted purely by way of example. In alternative embodiments, the FS may use the S3 versioning in any other suitable way to track the reference counts. For example, upon detecting that the hash value of an object to be written already exists, the FS may nevertheless rewrite both the data (value) and the metadata of the object (instead of only updating the metadata as in FIG. 3). In this implementation, too, S3 increments the version number, and the reference count remains correct.

Figure 4:
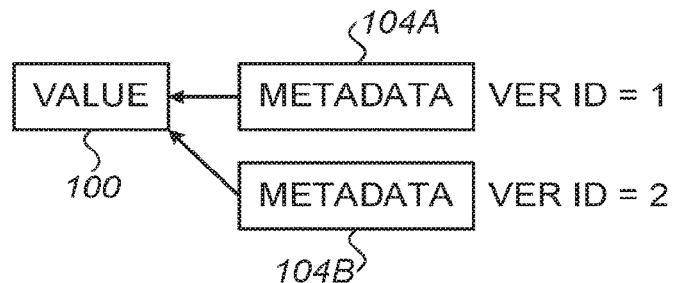
FIG. 4 is a diagram that schematically illustrates an object having a reference count implemented using S3 versioning, in accordance with an embodiment of the present invention.

FIG. 4 is a diagram that schematically illustrates an object having a reference count implemented using S3 versioning, in accordance with an embodiment of the present invention. This figure demonstrates the scenario described above, following one "metadata update" command. Initially, the FS stored a new object in S3, with a value 100 and metadata 104A. S3 assigned this object VER ID=1. At a later time, an object having the same data was produced in the FS, originating from some other file. Using the method of FIG. 2, the FS updated only the metadata of this object to metadata 104B. The metadata update caused S3 to assign a new version number, VER ID=2, to the object. The newly assigned version number serves as the reference count for this object, without a need for extra memory space or management overhead.

In various embodiments, the FS of system 20 may use the reference counts, maintained using S3 version numbers, for any suitable purpose. For example, when deleting a file, the FS typically decrements the S3 version number of each S3 object associated with the file. The update is typically performed using an Application Programming Interface (API) provided by S3, which enables deleting a certain version number of an object. This update causes the FS reference count of each of these objects to decrease, as well, to reflect the smaller number of files that share the object. The FS may delete objects that are associated with the deleted file and have VER ID=1 (indicating they were accessed only by the deleted file).

As another example, in some embodiments the FS carries out a background "garbage collection" process that identifies and deletes objects that are not referenced by any file or directory. In these embodiments, the FS may use the S3 version numbers to identify unreferenced objects.

In some scenarios, a cloud storage provider charges clients for different S3 versions of an object, even if the data (value) of the object is not actually duplicated. Thus, for example, merely updating the metadata of an object incurs substantially the same cost as duplicating the entire content of that object. Since in many cases the charge for content volume is a recurring monthly charge, maintaining multiple versions may become prohibitively expensive.

In some embodiments, the FS of system 20 avoids the duplicate cost of storing multiple versions of an object (referred to as "data object"), by defining a separate "reference-count object" associated with the data object. The reference-count object is a dummy object that is used for tracking the reference count of the associated data object. The reference-count object has a size of zero, or some small number of bytes, e.g., the minimal object size supported. In an example naming convention, the reference-count object associated with the data object XXX is named XXX RefCount.

In these embodiments, the FS tracks the reference count of the data object by causing S3 to update the version number (VER ID) of the associated reference-count object. In an example embodiment, the FS increments the reference count of the data object by performing "update metadata" for the reference-count object, or by simply uploading the reference-count object again. In this manner, the versioning mechanism of S3 is still used for tracking the reference count of the data object. The added cost incurred by this technique, however, is small, because it depends on the size of the reference-count object and not of the data-object.

In an embodiment, the FS uploads a data object named "12345" by carrying out the following sequence of operations:

1. update the metadata of the reference-count object "12345 RefCount".
    a. if (1) fails, do:
        i. upload data object "'12345".
        ii. upload reference-count object "12345 RefCount".
    b. else (1) passed successfully: Done The above technique, of storing a separate reference-count object, can be used for all the objects in an S3 bucket, for a subset of the objects, e.g., for the objects larger than a certain size or having a reference count higher than some threshold, or even for a single object.

Although the embodiments described herein mainly address storage of files and directories by a FS, the methods and systems described herein can also be used in any other suitable system or application that stores data and uses reference counts. For example, the disclosed techniques can be used for tiered storage, e.g., for storing rarely-accessed ("cold") data in a cloud service and frequently-accessed ("hot") data locally.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

What is claimed is:
1. A method comprising:
receiving, at data processing hardware, data for storage from one or more workloads;
determining, by the data processing hardware, that a cloud-based object storage system stores an object matching the received data for storage, the cloud-based object storage system comprising a built-in versioning mechanism that assigns version numbers to objects stored therein, each respective object stored in the cloud-based object storage system comprising a first corresponding object metadata comprising a first version number, wherein the first version number serves as a reference count for each respective object;

sending, from the data processing hardware to the cloud-based object storage system, an update metadata command related to the object matching the received data for storage, the update metadata command, when received by the cloud-based object storage system, forcing the built-in versioning mechanism of the cloud-based object storage system to generate a second corresponding object metadata comprising a second version number for the object matching the received data for storage, wherein the second version number serves as an updated reference count for the object matching the received data for storage;

sending, from the data processing hardware to the cloud-based object storage system, an instruction to update a dummy object associated with a given object; and tracking, using the dummy object, the reference count for the given object, wherein the cloud-based object storage system maintains, for the object matching the received data for storage, both the first version number of the first corresponding object metadata and the second version number of the second corresponding object metadata simultaneously.

2. The method of claim 1, further comprising:

determining a hash value for an object of the received data, and wherein determining that the cloud-based object storage system stores an object matching the received data for storage comprising matching the hash value of the object of the received data to the object already stored in the cloud-based object storage system.

3. The method of claim 2, wherein the cloud-based object storage system stores objects with hash values of the stored objects serving as keys.

4. The method of claim 2, further comprises:

instructing, by the data processing hardware, the cloud-based object storage system to update the object matching the received data based on the determined hash value; and determining, by the data processing hardware, whether the update succeeded or failed.

5. The method of claim 4, wherein instructing the cloud-based object storage system to update the object matching the received data based on the determined hash value comprises instructing the cloud-based object storage system to update a dummy object corresponding to the determined hash value.

6. The method of claim 4, wherein instructing the cloud-based object storage system to update the object matching the received data based on the determined hash value comprises instructing the cloud-based object storage system to generate the second corresponding object metadata of the object matching the received data based on the determined hash value.

7. The method of claim 1, wherein the update metadata command forces the built-in versioning mechanism to generate the second corresponding object metadata of the object matching the received data for storage but not update a corresponding value of the object matching the received data for storage.

8. The method of claim 1, further comprising sending, from the data processing hardware, an instruction to the cloud-based object storage system to update a corresponding value of the object matching the received data for storage.

9. The method of claim 1, wherein the dummy object associated with the given object comprises a size of zero.

10. The method of claim 1, wherein the dummy object associated with the given object comprises a minimal size supported by the cloud-based object storage system.

11. A system comprising:

an interface for communicating with a cloud-based object storage system, the cloud-based object storage system comprising a built-in versioning mechanism that assigns version numbers to objects stored within the cloud-based object storage system, each respective object stored in the cloud-based object storage system comprising a first corresponding object metadata comprising a first version number, wherein the first version number serves as a reference count for the respective object; and one or more processors configured to perform operations comprising:

receiving data for storage from one or more workloads;

determining that the cloud-based object storage system stores an object matching the received data for storage;

sending, to the cloud-based object storage system, an update metadata command related to the object matching the received data for storage, the update metadata command, when received by the cloud-based object storage system, forcing the built-in versioning mechanism of the cloud-based object storage system to generate a second corresponding object metadata comprising a second version number for the object matching the received data for storage, wherein the second version number serves as an updated reference count for the object matching the received data for storage;

sending, from the data processing hardware to the cloud-based object storage system, an instruction to update a dummy object associated with a given object; and tracking, using the dummy object, the reference count for the given object, wherein the cloud-based object storage system maintains, for the object matching the received data for storage, both the first version number of the first corresponding object metadata and the second version number of the second corresponding object metadata, simultaneously.

12. The system of claim 11, wherein the operations further comprise:

determining a hash value for an object of the received data, and wherein determining that the cloud-based object storage system stores an object matching the received data for storage comprising matching the hash value of the object of the received data to the object already stored in the cloud-based object storage system.

13. The system of claim 12, wherein the cloud-based object storage system stores objects with hash values of the stored objects serving as keys.

14. The system of claim 12, wherein the operations further comprise:

instructing the cloud-based object storage system to update the object matching the received data based on the determined hash value; and determining whether the update succeeded or failed.

15. The system of claim 14, wherein instructing the cloud-based object storage system to update the object matching the received data based on the determined hash value comprises instructing the cloud-based object storage system to update a dummy object corresponding to the determined hash value.

16. The system of claim 14, wherein instructing the cloud-based object storage system to update the object matching the received data based on the determined hash value comprises instructing the cloud-based object storage system to generate the second corresponding object metadata of the object matching the received data based on the determined hash value.

17. The system of claim 11, wherein the update metadata command forces the built-in versioning mechanism to generate the second corresponding object metadata of the object matching the received data for storage but not update a corresponding value of the object matching the received data for storage.

18. The system of claim 11, wherein the operations further comprise sending an instruction to the cloud-based object storage system to update a corresponding value of the object matching the received data for storage.

19. The system of claim 11, wherein the dummy object associated with the given object comprises a size of zero.

20. The system of claim 11, wherein the dummy object associated with the given object comprises a minimal size supported by the cloud-based object storage system.

* * * * *